United States Patent
Hwang

(10) Patent No.: US 8,323,606 B2
(45) Date of Patent: Dec. 4, 2012

(54) HETERO-NANOCAPSULE AND METHOD OF PREPARING THE SAME

(75) Inventor: Gan-Lin Hwang, Tainan (TW)

(73) Assignee: Industrial Technology Research Institute, Hsinchu (TW)

( * ) Notice: Subject to any disclaimer, the term of this patent is extended or adjusted under 35 U.S.C. 154(b) by 610 days.

(21) Appl. No.: 11/002,674

(22) Filed: Dec. 3, 2004

(65) Prior Publication Data

US 2006/0008404 A1    Jan. 12, 2006

(30) Foreign Application Priority Data

Jul. 12, 2004 (TW) .............................. 93120768 A

(51) Int. Cl.
*C01B 31/02* (2006.01)
*C01B 31/00* (2006.01)

(52) U.S. Cl. ............... 423/445 B; 427/447.1; 977/844; 204/164; 204/173

(58) Field of Classification Search ............ 423/445 B, 423/447.1–447; 977/734–753, 844, 846, 977/848; 204/164, 173
See application file for complete search history.

(56) References Cited

U.S. PATENT DOCUMENTS

| | | | | |
|---|---|---|---|---|
| 5,627,353 A | * | 5/1997 | Oeste ..................... | 204/157.15 |
| 6,303,760 B1 | * | 10/2001 | Dorn et al. .............. | 534/11 |
| 6,455,021 B1 | * | 9/2002 | Saito ...................... | 423/447.3 |
| 6,599,492 B2 | * | 7/2003 | Iwamura et al. ......... | 423/445 B |
| 6,602,485 B1 | * | 8/2003 | Tsuboi ................... | 423/445 R |
| 7,494,638 B1 | * | 2/2009 | Huffman et al. ........ | 423/445 B |
| 2002/0061397 A1 | * | 5/2002 | Iwamura et al. ........ | 428/334 |

OTHER PUBLICATIONS

Manaa, Electronic structure of solid C48N12 aza-fullerene, Solid State Communications 2004; 129: 379-383.*
Dresselhaus, et al., Science of Fullerenes and Carbon Nanotubes, 70 (Academic Press 1996).*
Jiao, et al., Carbon encapsulated nanoparticles of Ni, Co, Cu, and Ti, J. Appl. Phys. 1998; 83(5): 2442-2448.*
Ugarte, Onion-like Graphitic Particles, Carbon 1995; 33(7): 989-993.*
Ugarte, Curling and closure of graphitic networks under electron-beam irradiation, Nature 1992; 359: 707-709.*
Glerup, et al., Synthesis of N-doped SWNT using the arc-discharge procedure, Chem. Phys. Ltrs. 2004; 387: 193-197.*
Dresselhaus, et al., Fullerenes, J. Mater. Res., 1993; 8(8): 2054-2097.*

* cited by examiner

*Primary Examiner* — Daniel C. McCracken
(74) *Attorney, Agent, or Firm* — Birch, Stewart, Kolasch & Birch, LLP

(57) ABSTRACT

Hetero-nanocapsule, which is a carbon nanocapule containing heteroatoms, comprises a closed graphite layer represented by a chemical formula $C(D)_x$, wherein C is carbon atom exhibiting $sp^2$ hybrid orbital, D is hetero-atom, such as B, N, P, or S atom, bonded to the carbon atom; and X is a molar equivalent ranging from 0.0001 to 0.1, based on the molar equivalent of carbon atom as 1. The hetero-nanocapsules may be hollow or filled with metal or metal compound.

10 Claims, 4 Drawing Sheets

HETERO-NANOCAPSULE AND METHOD OF PREPARING THE SAME

BACKGROUND OF THE INVENTION

1. Field of the Invention

The invention relates to a hetero-nanocapsule and, more particularly, to a carbon nanocapsule containing heteroatoms and method of preparing the same.

2. Brief Discussion of the Related Art

Hetero-nanocapsules are polyhedral carbon clusters constituting by closed multiple graphite layers structure. The diameter of a hetero-nanocapsule is about 1-100 nm. The center of carbon nanocapsule is hollow or filled with several metal or metalcarbide.

The closed graphite layers prevent encapsulated metal grains from fusing with other materials or diffusing out the nanocapsule. The graphite layers also protect the metal grain from oxidation by the environment, thereby maintaining the quantum properties of the nanocapsule.

The polyhedral morphology of carbon nanocapsules exhibits flat graphitic layers except at the corners where the pentagons are located; all atoms on the nanocapsule are $sp^2$ hybrid orbital. The carbon nanocapsule is brought about by well-developed graphitic structure, with thermal and electric conductance, high mechanical strength, chemical stability, large superficial content, firm structure and electromagnetic interference shielding. The graphite layers of nanocapsules can be modified to be hetero-atom doped, increasing dispersibility in solvent, bonding ability, and conductibility thereof.

The conventional methods are not, however, suitable for production of carbon nanocapsules containing heteroatoms in the graphite layers. A related reference has disclosed boron nitride (BN) fullerene nanomaterials having shells of boron-nitride (BN), carbon-boron-nitride (B—C—N), boron carbide ($BC_3$), or carbon nitride ($C_3N_4$), rather than having multiple graphite layers. Furthermore, as disclosed in another related reference, carbon nanotubes doped with nitrogen atoms, but shells thereof do not inherit a polyhedral structure. Accordingly, related applications of carbon nanocapsules containing heteroatoms are limited and insufficient.

SUMMARY OF THE INVENTION

Embodiments of the invention provide carbon nanocapsules doped with hetero-atoms in the graphite layers. The hetero-nanocapsules are highly dispersibility and can be extensively utilized in various fields such as medicine (medical grade active carbon), light and heat absorption, magnetic recording, magnetic fluids, catalysts, sensors, light absorbent, and nanoscale composite materials with thermal and/or electric conductivity.

Embodiments of the invention further provide a method for fabricating carbon nanocapsules containing heteroatoms.

According to embodiments of the invention, a carbon nanocapsule containing heteroatoms comprises at least one closed graphite layer. The graphite layer is represented by a chemical formula $C(D)_x$, wherein C is carbon atom exhibiting $sp^2$ hybrid orbital, D is an atom of Group III or V of the periodic table and bonded to the carbon atom, and X is a molar equivalent between 0.0001 and 0.1, based on the molar equivalent of carbon atom as 1.

According to embodiments of the invention, the center of hetero-nanocapsules are hollow or filled with metal, metal oxide, metal carbide, metal sulfide, metal nitride, metal borate, or alloy.

In embodiments of the invention, a method for preparing carbon nanocapsules containing heteroatoms comprises providing an arc chamber comprising a composite graphite anode and a graphite cathode and an inert gas introduced into the arc chamber. The composite graphite anode comprises compounds containing atoms of Group III or V of the periodic table and graphite, wherein the ratio of atoms of Group III or V to the carbon atoms is from 1:50 to 1:10. Voltage is applied across the cathode and the anode by a pulse current, sufficient to generate a carbon arc reaction between the cathode and the anode. The deposit formed on the cathode is collected.

The composite graphite anode may comprise, alternatively, compounds containing atoms of Group III or V of the periodic table, metal or metalline powders, and graphite, wherein the ratio of atoms of Group III or V to carbon atoms is from 1:50 to 1:20, and the ratio of metal atoms to carbon atoms is from 1:100 to 1:20.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The invention can be more fully understood by the subsequent detailed description in conjunction with the examples and references made to the accompanying drawings, wherein.

DETAILED DESCRIPTION OF THE PREFERRED EMBODIMENTS

Figure 1:
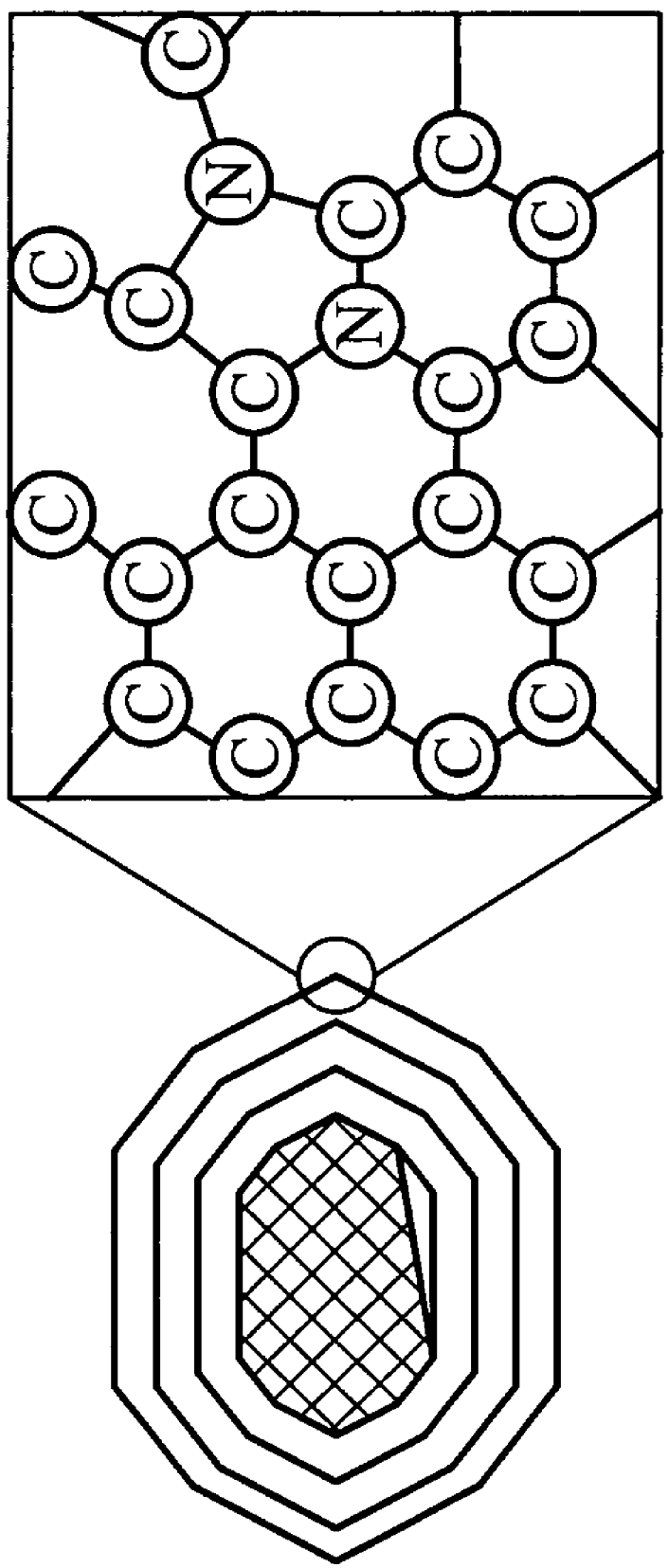
FIG. 1 is a close-up schematic drawing of carbon nanocapsules containing heteroatoms according to embodiments of the invention.

Carbon nanocapsules containing heteroatoms are polyhedral carbon clusters with completed and closed polyhedral graphite layers. In carbon nanocapsules containing heteroatoms according to embodiments of the invention, some carbon atoms are replaced with atoms of Group III or V of the periodic table, such as nitrogen, boron, phosphorous or sulfur atoms, as shown in FIG. 1. Due to the doped heteroatom, the nanocapsule exhibits specific properties of atoms of Group III or V, such as hole-rich or electron-rich ferromagnetism. The graphite layer with heteroatoms replacing the carbon atom is made up of pentagonal and hexagonal rings, atoms thereof exhibiting $sp^2$ hybrid orbital. The carbon nanocapsule containing heteroatoms exhibits unsaturated double bonds while retaining the specific properties of graphite.

Since the heteroatoms, such as N, favor to exhibit $sp^3$ hybrid orbital, the heteroatom prefers locating on the corners of the polyhedral graphite layer, namely locating on the pentagonal rings.

Theoretically, nitrogen atoms located at the corners of the polyhedral graphite layer exhibits different configuration from those on the hexagonal rings. The polyhedral graphite layer of the carbon nanocapsule containing heteroatoms can have, but is not limited to, 12 corners.

The graphite layer can be represented by a chemical formula $C(D)_x$, wherein C is carbon atom exhibiting $sp^2$ hybrid orbital, D an atom of Group III or V of the periodic table and bonded to the atom carbon, and x a number between 0.0001 and 0.1. The carbon nanocapsule may be hollow or filled with metal or metal compound.

A method of preparing the hollow or metal-contained carbon nanocapsule is also disclosed.

A carbon nanocapsule containing heteroatoms of embodiment of the invention has at least one closed graphite layer. The graphite layer is represented by a chemical formula $C(D)_x$, wherein C is carbon atom exhibiting $sp^2$ hybrid orbital, D is an atom of Group III or V of the periodic table such as nitrogen, phosphorous, or boron, and bonded to the carbon atom. X is a molar equivalent between 0.0001 and 0.1, preferably between 0.005 and 0.05, more preferably between 0.01 and 0.02 based on the molar equivalent of carbon atom as 1.

The carbon nanocapsule containing heteroatoms can be hollow and comprise a graphite layer. The external diameter of the carbon nanocapsule containing heteroatoms is about 1-100 nm, preferably about 30~40 nm. Furthermore, the carbon nanocapsule containing heteroatoms can comprise at least two graphite layers and be tilled with 0.1~99 wt % fillers, such as metal, metal oxide, metal carbides, metal sulfide, metal nitride, metal borate, or alloy, based on the weight of the nanocapsule. Suitable metals or metallines can comprise, without being limited to, Sc, V, Cr, Fe, Co, Ni, Cu, Y, Zr, Mo, Ru, Rh, Pd, La, Ce, Pr, Nd, Gd, Tb, Dy, Ho, Er, Tm, Lu, Ta, Os, Ir, Pt, Au, Th, U, or combinations thereof.

In the method for preparing the carbon nanocapsule containing heteroatoms, an arc chamber comprising a composite graphite anode and a graphite cathode is provided. The composite graphite anode comprises compounds containing atoms of Group III or V of the periodic table and graphite. The compounds containing atoms of Group III or V can be, but not limited to, melamine, ammonium chloride, $B_4C$, $B_2O_3$, or $P_2O_5$. In the composite graphite anode, the ratio of atoms of Group III or V to the carbon atoms is from 1:50 to 1:10. Furthermore, the composite graphite anode can further comprise metal or metalline powders for preparing a carbon nanocapsule containing heteroatoms, filled with metal or metal compound, wherein the ratio of metal atoms to carbon atoms is from 1:100 to 1:20. It is noted that the compounds containing atoms of Group III or V can also be metal phosphide, metal nitride or metal borate. The graphite cathode is graphite.

An inert gas is introduces into the arc chamber at of a flow rate 10 to 200 $mm^3$/min, preferably 30 to 120 $mm^3$/min. Suitable inert gases include, but are not limited to, helium, argon, and nitrogen. Pressure of the arc chamber can be 0.1 to 5 atm, preferably 1 to 2 atm.

Next, voltage is applied across the cathode and the anode by a pulse current, sufficient to generate a carbon arc reaction between the cathode and the anode. The pulse current can be 50 to 800 A at a frequency of 0.01 to 1000 Hz. Voltage between electrodes can be controlled to 10 to 30V.

Product located on the cathode is collected. Obtained carbon nanocapsules containing heteroatoms can be further purified by dispersal in a solution with heteroatom main product and carbon nanotube byproduct separated using column chromatography or filter film.

Due to the heteroatom, the carbon nanocapsules according to the embodiments of the invention exhibit hole-rich or electron-rich ferromagnetism and high dispersibility, and can be extensively utilized in various fields such as medicine (medical grade active carbon), light and heat absorption, magnetic recording, magnetic fluids, catalysts, sensors, light absorbent and nanoscale composite materials with thermal and/or electric conductance.

The following examples are intended to illustrate the invention more fully without limiting their scope, since numerous modifications and variations will be apparent to those skilled in this art.

First Example

One graphite rod was used as an anode, and one composite graphite rod was used as a cathode, both with diameter of 1 centimeter. The composite graphite electrode was made by mixing 15 g melamine, 10 g $NH_4C$, and 200 g carbon powder, with molar ratio of nitrogen to carbon from 1:50 to 1:20. The mixture was molded into an electrode by hot-pressing at 170° C. The anode and cathode were disposed in an arc chamber.

Voltage was applied across the cathode and the anode by a pulse current, sufficient to generate a carbon arc reaction between the cathode and the anode, conducted under flowing argon gas at flow rate of 60 to 90 $mm^3$/min, and pressure of the arc chamber was controlled at 1.2 atm. The pulse current was controlled at 120 A at a frequency of 100 Hz, and voltage between electrodes at 20V.

The carbon arc reaction proceeded for about 30 minutes after which deposit was formed on the anode. The deposit was about 3-4 cm long of the same diameter as the graphite anode. The deposit was cut and 10 g black powdery crude product obtained at the core portion of the deposit.

Figure 2:
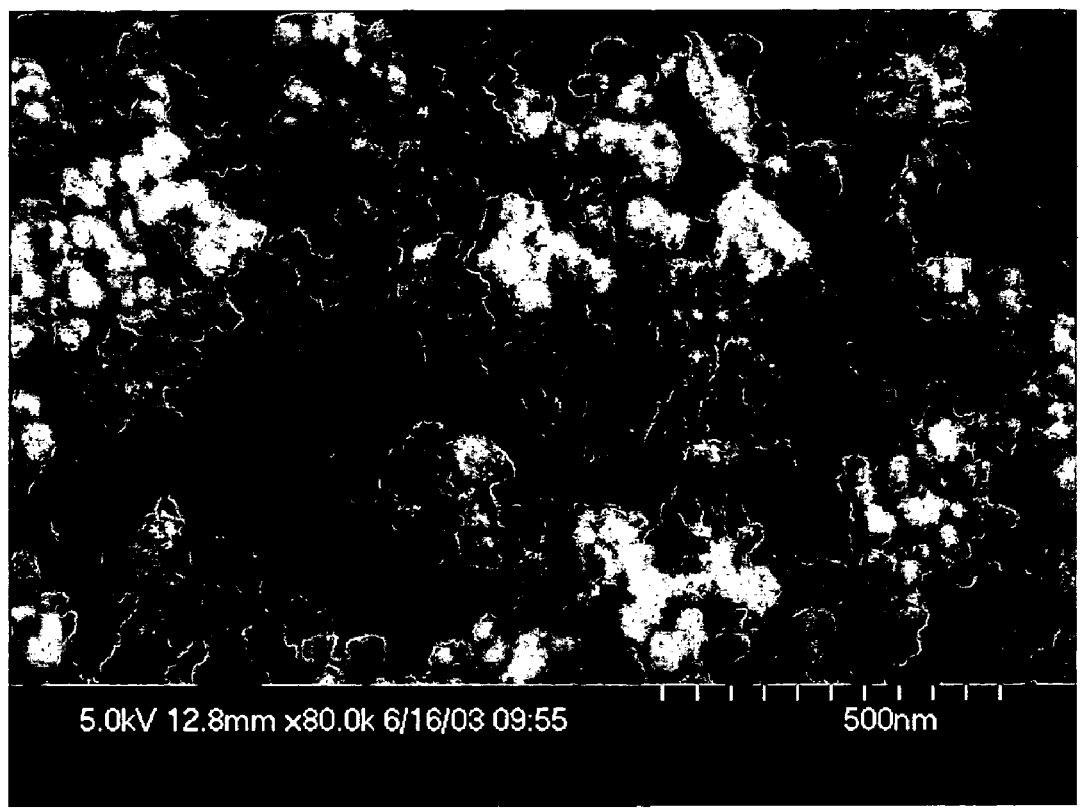
FIG. 2 is a SEM (scanning electron microscope) photograph of the carbon nanocapsule containing heteroatoms in one example of the invention.
Figure 3:
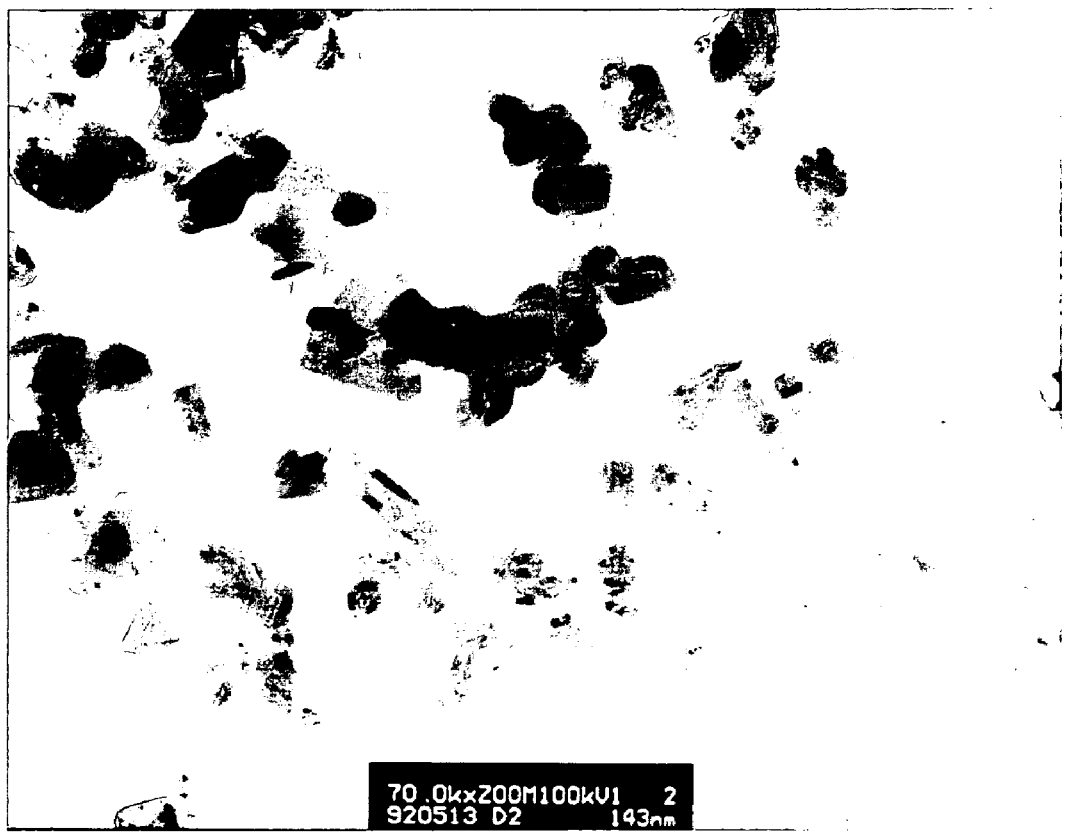
FIG. 3 is a TEM (transmission electron microscopy) photograph of the carbon nanocapsule containing heteroatoms in FIG. 2.

The crude product was then identified by SEM and transmission electron microscopy (TEM), referring to as shown in FIGS. 2 and 3, containing about 80% N-doped carbon nanocapsule, 20% short carbon nanotubes, and a trace carbon powder.

Figure 4:
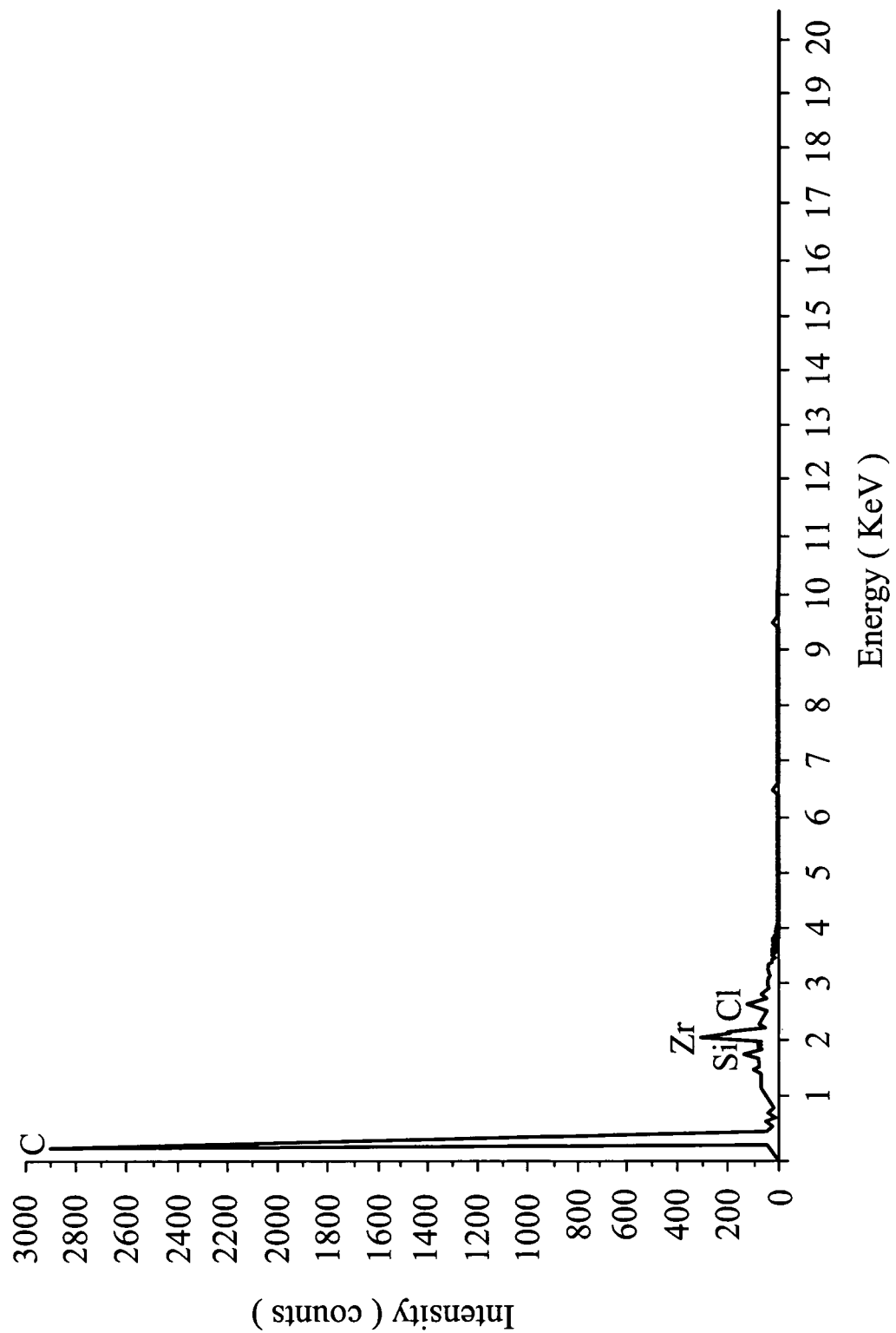
FIG. 4 is an EDX spectrum of the carbon nanocapsule containing heteroatoms in FIG. 2.

FIG. 4 is an EDX spectrum of the carbon nanocapsule containing heteroatoms, and Table 1 shows the composite atoms thereof. The weight ratio of nitrogen atom of the crude product is 1.25% through the energy disperse X-ray (EDX). Since nitrogen has a similar atomic weight to carbon, the nitrogen atom overlaps the EDX signal of the carbon atom in the EDX, dependent on the relative proportion of atoms. The carbon atom of the carbon nanocapsule is in the majority, thereby overlaying the EDX signal of nitrogen in the EDX.

TABLE 1

| atoms of crude product | weight ratio (%) |
|---|---|
| C | 90.46 |
| Si | 0.29 |
| Pt | 7.09 |
| N | 1.25 |
| Fe | 0.45 |
| Cl | 0.49 |

The crude product was dispersed in a solution of $H_2O$ and methanol (weight ratio=1:1). The carbon nanocapsule containing heteroatom main product and the carbon nanotube byproduct were separated.

The obtained carbon nanocapsule was tagged using iron ions, and identified by transmission electron microscopy (TEM), observing the adsorption of iron ions. As shown in FIG. 3, the nitrogen atoms locate at the corners of the polyhedral graphite layer, namely on the pentagons (five-member ring).

Second Example

Example 2 was performed the same as Example 1 excepting for substitution of 15 g melamine and 10 g $NH_4C$ for 5 g $B_4C$ (or 10 g $B_2O_3$) to form the composite graphite electrode. A B-doped carbon nanocapsule was obtained.

Third Example

Example 3 was performed the same as Example 1 excepting for substitution of 15 g melamine and 10 g $NH_4C$ for 10 g $P_2O_5$ to form the composite graphite electrode. A P-doped carbon nanocapsule was obtained.

Fourth Example

Example 4 was performed the same as Example 1 excepting for further adding 5 mol % iron powder (based on the molar equivalent of the graphite) to form the composite graphite electrode. A N-doped carbon nanocapsule filled with iron was obtained.

Fifth Example

Example 5 was performed the same as Example 2 excepting for further adding 5 mol % iron powder (based on the molar equivalent of the graphite) to form the composite graphite electrode. A B-doped carbon nanocapsule filled with iron was obtained.

Sixth Example

Example 6 was performed the same as Example 3 excepting for further adding 5 mol % iron powder (based on the molar equivalent of the graphite) to form the composite graphite electrode. A P-doped carbon nanocapsule filled with iron was obtained.

While the invention has been described by way of example and in terms of preferred embodiment, it is to be understood that the invention is not limited thereto. It is therefore intended that the following claims be interpreted as covering all such alteration and modifications as fall within the true spirit and scope of the invention.

What is claimed is:

1. A hetero-nanocapsule, which is a carbon cluster constituting a closed multiple graphite layer structure and containing heteroatoms, comprising a closed polyhedral graphite layer constituted by carbon atoms exhibiting $sp^2$ hybrid orbital and D atoms, wherein D is an atom of Group III or V of the periodic table bonded to the carbon, and the mole ratio between D atoms and carbon atoms is from 0.0001 to 0.1, wherein the closed polyhedral graphite layer is a hollow shell and is made up of pentagonal rings and hexagonal rings, wherein at least one flat outside side of the closed polyhedral graphite layer has a length of larger than 1 nm.

2. The hetero-nanocapsule as claimed in claim 1, wherein the external diameter thereof is 1 nm to 100 nm.

3. The hetero-nanocapsule as claimed in claim 1, further comprising a filler M in the hollow closed graphite shell.

4. The hetero-nanocapsule as claimed in claim 3, wherein M is metal, metal oxide, metal carbide, metal sulfide, metal nitride, metal borate, or alloy.

5. The hetero-nanocapsules as claimed in claim 4, wherein the metal atom of the metal, metal oxide, metal carbide, metal sulfide, metal nitride, metal borate, or alloy is Sc, V, Cr, Fe, Co, Ni, Cu, Y, Zr, Mo, Ru, Rh, Pd, La, Ce, Pr, Nd, Gd, Tb, Dy, Ho, Er, Tm, Lu, Ta, Os, Ir, Pt, Au, Th, U or a combination thereof.

6. A method for preparing hetero-nanocapsules, comprising mixing compounds containing atoms of Group III or V of the periodic table and graphite, at a ratio from 1:50 to 1:10; molding the mixture into an electrode by hot-pressing to form a composite graphite anode; providing an arc chamber comprising the composite graphite anode and a graphite cathode; introducing inert gas into the arc chamber; applying voltage across the cathode and the anode by pulse current to generate a carbon arc reaction therebetween, and collecting deposit formed on the cathode.

7. The method as claimed in claim 6, wherein the compounds containing atoms of Group III or V of the periodic table comprise melamine, ammonium chloride, $B_4C$, $B_2O_3$, or $P_2O_5$.

8. A method for preparing hetero-nanocapsules, comprising mixing compounds containing atoms of Group III or V of the periodic table, metal or metalline powders, and graphite, wherein the ratio of atoms of Group III or V to the carbon atoms is from 1:50 to 1:10, and the ratio of metal atoms to carbon atoms is from 1:100 to 1:20; molding the mixture into an electrode by hot-pressing to form a composite graphite anode; providing an arc chamber comprising the composite graphite anode and a graphite cathode; introducing an inert gas into the arc chamber; applying a voltage across the cathode and the anode by pulse current to generate a carbon arc reaction therebetween, and collecting deposit formed on the cathode.

9. The method as claimed in claim 8, wherein the compounds containing atoms of Group III or V of the periodic table comprise melamine, ammonium chloride, $B_4C$, $B_2O_3$, or $P_2O_5$.

10. The method as claimed in claim 9, wherein the metal atom of the metal or metalline powders are Sc, V, Cr, Fe, Co, Ni, Cu, Y, Zr, Mo, Ru, Rh, Pd, La, Ce, Pr, Nd, Gd, Tb, Dy, Ho, Er, Tm, Lu, Ta, Os, Ir, Pt, Au, Th, U or a combination thereof.

* * * * *